March 13, 1962 B. R. MENNESSON 3,024,834
APPARATUS FOR AUTOMATICALLY CENTERING WIRE SPOKE WHEELS
Filed Nov. 9, 1959

INVENTOR
BERNARD RENÉ MENNESSON
BY
Bailey, Stephens & Huettig
ATTORNEYS

United States Patent Office 3,024,834
Patented Mar. 13, 1962

3,024,834
APPARATUS FOR AUTOMATICALLY CENTERING WIRE SPOKE WHEELS
Bernard René Mennesson, Neuilly-sur-Seine, France, assignor to Societe d'Appareils de Controle et d'Equipment des Moteurs S.A.C.E.M., Neuilly-sur-Seine, France, a society of France
Filed Nov. 9, 1959, Ser. No. 851,894
Claims priority, application France Nov. 14, 1958
2 Claims. (Cl. 157—1.5)

The present invention relates to an apparatus for centering a wire spoke wheel, that is to say a wheel including a hub and a rim assembled together by a plurality of wire spokes secured to the rim by means of adjustment nipples.

The invention is more especially concerned with apparatus for centering cycle wheels of this kind and in particular wheels for bicycles having an auxiliary engine.

It is known that the centering of such a wheel consists in adjusting the rim thereof so that every portion thereof is at a given axial distance with respect to the hub and at a given radial distance from the hub axis, the expression "given" distance meaning, not that this distance has exactly a given value but that it is within a given range of values.

It is also known that by tightening or loosening every adjustment nipple, the above mentioned axial and radial distances for the portion of the rim adjoining said nipple are simultaneously modified.

The centering operations of such wheels are generally made manually and require specialized workmen so that their cost is very high.

The object of the present invention is to provide an apparatus capable of effecting the centering operation in an automatic manner so that it can be operated by workmen having no special training.

The apparatus according to this invention essentially includes a frame capable of holding the hub of the wheel, a number of motors equal to the number of spokes of the wheel, each of these motors being capable of tightening or loosening an adjustment nipple according as said motor is running in one direction or the other, means capable of supplying two different signals according as the axial distance (as above defined) of the portion of the wheel adjoining the corresponding nipple is above or below the range permitted for said axial distance, and means capable of supplying two different signals according as the radial distance of the portion of the rim adjoining the above mentioned nipple is above or below the range of values permitted for said radial distance, the whole being such that every motor is operated in the desired direction when the corresponding above mentioned means supply either an axial distance signal alone or a radial distance signal alone or both an axial distance signal and a radial distance signal in agreement with each other, said motor remaining at rest in the other cases (no signal at all or an axial distance signal and a radial distance signal in opposition with each other). The axial distance signal and the radial distance signal are said to be in agreement when both are to produce either a tightening or a loosening of the nipple that is being considered. If one of said signals requires a tightening of the nipple and the other a loosening of the same nipple, they are said to be in opposition.

A preferred embodiment of the present invention will be hereinafter described with reference to the drawing given merely by way of example and in which.

Figure 1:
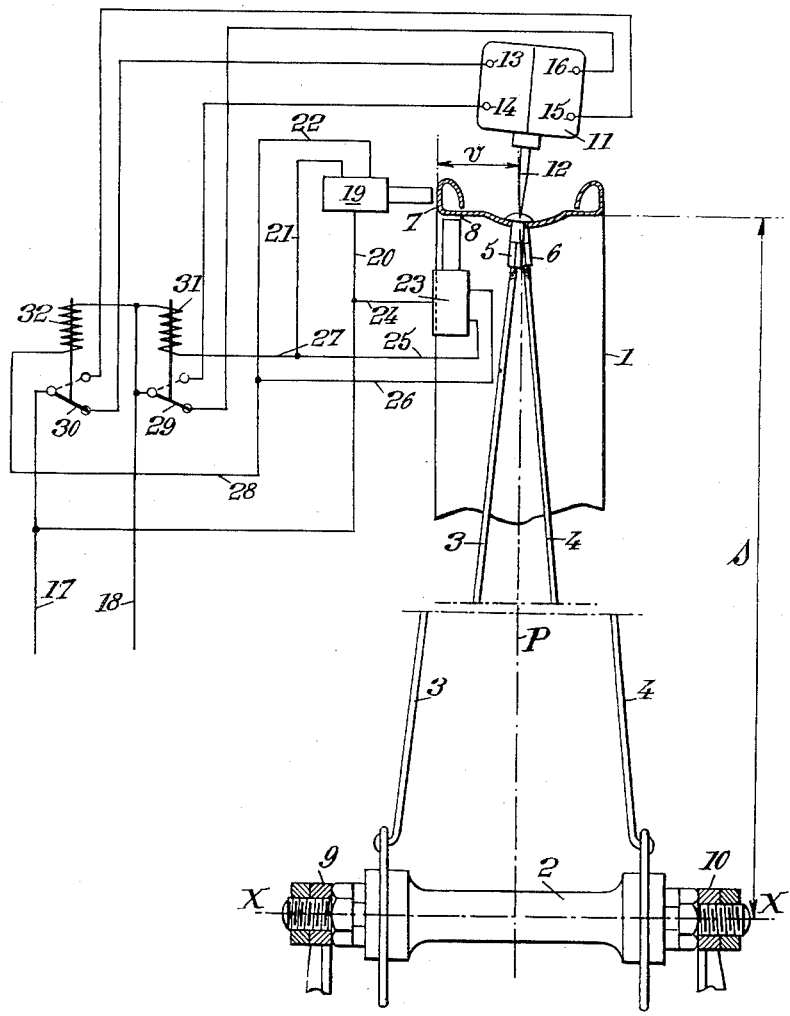
FIG. 1 is a partial diagrammatical view of a centering apparatus made according to the invention, the wheel to be centered being shown in section by an axial plane.

The wheel to be centered includes a rim 1 and a hub 2 assembled together by a plurality of wire spokes 3 and 4 alternately secured to one side and the other of hub 2 and fixed to the rim by means of adjustment nipples such as 5 and 6 engaging the screw threaded heads of said spokes 3 and 4 (FIG. 1).

The above mentioned "axial distance" is the distance $v$ from a side wall 7 of the rim at a point thereof to a reference plane P, which is for instance the plane of symmetry of the wheel perpendicular to hub 2. The above mentioned "radial distance" is the distance from a peripheral wall 8 of the rim to the axis of symmetry X—X of hub 2. The centering operation consists in giving the "axial distance" $v$ of every point of the rim a value ranging between two limits $v_1$ and $v_2$, that is to say in bringing said "axial distance" $v$ within a given range defined by said limit values $v_1$ and $v_2$. On the other hand, the "radial distance" $s$ is to be given, for every point of the rim, a value ranging between two limits $s_1$ and $s_2$ close to each other, that is to say $s$ is to be brought within a given range defined by its limits $s_1$ and $s_2$. The value of each of said ranges is for instance 0.4 mm. In view of the oblique position of the spokes, for instance of spoke 3, it will be seen that if the corresponding nipple 5 is tightened, this tends simultaneously to increased the axial distance and to reduce the radial distance, whereas the reverse is obtained if said nipple is loosened.

The frame of the apparatus is essentially constituted by two supports 9 and 10 capable of holding the hub 2 of the wheel in a given position.

The reversible motors above referred to are each constituted by an electric motor 11 the shaft of which carries a screw driver 12 adapted to engage in a slot provided in the head of nipple 5. Said motor 11 is provided with four terminals 13, 14, 15 and 16 adapted to be fed with electric current from two electric conductors 17 and 18. Motor 11 runs either in one direction or in the opposite one according as either terminals 13 and 14 or terminals 15 and 16 are connected respectively to conductors 17 and 18. In the following description, it will be supposed that the feed of current to terminals 13 and 14 causes nipple 5 to be tightened, whereas the feed of current to terminals 15 and 16 causes said nipples to be loosened. To facilitate a good understanding of the drawing, a line has been shown on motor 11 (FIG. 1) to separate tightening terminals 13 and 14 from loosening terminals 15 and 16.

The means for producing the axial distance signals are made as follows.

They comprise a proximity sensitive pneumatic micrometer 19 of any known type located opposite the place normally occupied by the wall 7 of the rim 1 of a wheel the hub of which is fixed by means of supports 9 and 10. This micrometer includes a switch actuated by the unbalance of the gaseous fluid pressure within the micrometer caused by changes in the proximity of the micrometer to the rim, capable of connecting an input conductor 20, connected to conductor 17, to either of two output conductors 21 and 22 according as the axial distance is below or above the permitted range of values within which it should be, that is to say according as nipple 5 is to be tightened or loosened. Said switch places conductor 20 out of connection with conductors 21 and 22 when the axial distance is inside the above mentioned range of values.

In a likewise manner, the means for producing radial distance signals comprise a micrometer 23 located opposite the wall 8 of the wheel and including a switch capable of connecting an input conductor 24, connected to conductor 17 in parallel with conductor 20, to either of two output conductors 25 and 26 according as the radial distance is above or below the range of values permitted for said distance, that is to say according as nipple 5 is to be tightened or loosened. Input conductor 24 is out of connection with output conductors 25 and 26 when the radial distance is inside said range. Furthermore, conductors 21 and 25 (which correspond to a tightening of nipple 5) are connected to a common conductor 27, whereas conductors 22 and 26 (which correspond to a loosening of said nipple) are connected to a common conductor 28.

Between conductors 17 and 18 and motor 11, there is inserted a switch 29 to produce a tightening of the nipple and a switch 30 to produce a loosening thereof. These switches 29 and 30 are respectively controlled by coils 31 and 32. One end of each of these coils is permanently connected to conductor 18, whereas their respective other ends are connected respectively to conductors 27 and 28. Switches 29 and 30 are in the position shown in solid lines (called "position of rest") when their respective coils are not energized and they are in the position shown in dotted lines (called "active position") when their respective coils 31 and 32 are fed with current.

When switch 29 is in the position of rest (solid lines), it connects conductor 18 with the terminal 16 of motor 11 (loosening of the nipple) and when said switch is in the active position (dotted lines), it connects conductor 18 with the terminal 14 of the motor (tightening of the nipple). When switch 30 is in the position of rest (solid lines), it connects conductor 17 to the terminal 13 of the motor and when said last mentioned switch is in the active position (dotted lines), it connects said conductor 17 with terminal 15 of the motor.

The operation of the apparatus is indicated by the following table.

In this table, the column marked "Current fed to coils" indicates, between brackets, through which conductor (starting from the micrometers 19 and 23) current is fed to coils 31 or 32. In the columns marked "v" and "s," the negative sign — indicates the distance (either v or s) is below the permitted range, whereas the positive sign + indicates that this distance is above said range.

| v | s | Current fed to: | | Result |
|---|---|---|---|---|
| | | Coils | Motor terminals | |
| − | Correct | 31(21) | 13, 14 | Tightening of nipple. |
| Correct | + | 31(25) | 13, 14 | Do. |
| − | + | 31(21, 25) | 13, 14 | Do. |
| + | Correct | 32(22) | 15, 16 | Loosening of nipple. |
| Correct | − | 32(26) | 15, 16 | Do. |
| + | − | 32(22, 26) | 15, 16 | Do. |
| Correct | Correct | Nil | 13, 16 | Nil. |
| + | + | 31(25), 32(22) | 14, 15 | Do. |
| − | − | 31(21), 32(26) | 14, 15 | Do. |

It will be seen that the apparatus above described performs the desired adjustment when necessary.

Figure 2:
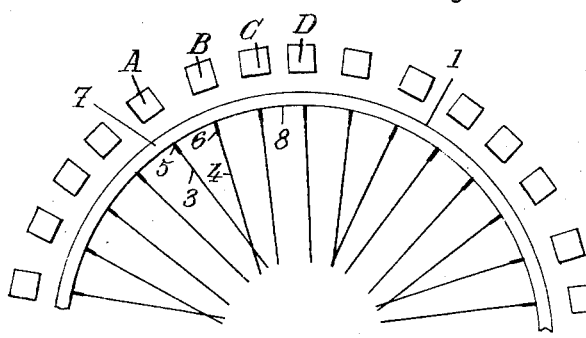
FIG. 2 is a view still more diagrammatic of the whole of the apparatus shown in side view.

FIG. 2 shows the whole of the apparatus, every motor with the corresponding micrometer and switches being indicated by a rectangular block numbered A, B, C, D, and so on.

It may happen that one wheel rim has a diameter such that it is impossible to give it a value of the radial distance equal to that of another wheel rim. It is therefore advantageous to provide micrometers 23 in such manner that they can be adjusted as a whole to the frame of the apparatus. It is advantageous to provide every motor 11 with means for limiting the tightening torque.

In a general manner, while I have, in the above description, disclosed what I deem to be a practical and efficient embodiment of my invention, it should be well understood that I do not wish to be limited thereto as there might be changes made in the arrangement, disposition and form of the parts without departing from the principle of the present invention as comprehended within the scope of the accompanying claims.

What I claim is:

1. An apparatus for centering a wheel including a hub, a rim, a plurality of wire spokes each fixed at one end to said hub alternately on one side and the other of the transverse plane of symmetry of said hub, the other end of said spoke being screw threaded, and a plurality of nipples mounted in said rim and engaging the screw threaded ends of said spokes, this apparatus comprising, in combination, frame means for holding said hub in fixed position, a plurality of motors mounted to form a circular row about said rim, each of said motors being located opposite one of said nipples respectively, said motors being capable of running in one direction or the other, means carried by each of said motors for engaging each of said nipples, respectively, to either tighten or loosen it according as said motor is running in one direction or the other, means fixed with respect to said frame means for supplying either of two different signals according as the axial distance of a point of the portion of said rim located opposite each of said motors from a transverse plane passing perpendicularly through the center of said hub is above or below a permissible range, respectively, said signal supplying means giving no signal when said axial distance is within said range, means fixed with respect to said frame means for supplying either of two different signals according as the radial distance of a point of the portion of said rim located opposite each of said motors from the axis of said hub is above or below a permissible range, respectively, said last mentioned signal supplying means giving no signal when said radial distance is within said last mentioned range, and control means responsive to the signals given by said two signal supplying means corresponding to a given motor for operating said motor in the direction tending to restore said axial and radial distances into said respective ranges for the portion of said rim corresponding to said given motor, said control means being arranged to operate said motor in response to one of said signals alone, or, when there are two signals received from said two signal supplying means respectively, to operate said motor only in response to two such signals both corresponding to the same direction of rotation of said motor.

2. An apparatus according to claim 1 in which said motors are electric motors and said signals are electric signals.

References Cited in the file of this patent

UNITED STATES PATENTS

| 1,980,129 | Eksergian et al. | Nov. 6, 1934 |
| 2,069,516 | Baker | Feb. 2, 1937 |
| 2,633,907 | Douglas | Apr. 7, 1953 |
| 2,687,454 | Hall | Aug. 24, 1954 |

FOREIGN PATENTS

| 281,996 | Great Britain | July 12, 1928 |